(12) United States Patent
Wang et al.

(10) Patent No.: US 11,319,235 B2
(45) Date of Patent: May 3, 2022

(54) GLASS MANUFACTURING PROCESS

(71) Applicant: Owens-Brockway Glass Container Inc., Perrysburg, OH (US)

(72) Inventors: Zhongming Wang, Ypsilanti, MI (US); Udaya Vempati, Ottawa, IL (US); Casey Townsend, Perrysburg, OH (US); Earnest R Iddings, Sylvania, OH (US); Sutapa Bhaduri, Holland, OH (US); Nicholas A. Schoenrock, Rudolph, OH (US); Ya-Cheng Lin, Jersey City, NJ (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 288 days.

(21) Appl. No.: 16/590,077

(22) Filed: Oct. 1, 2019

(65) Prior Publication Data

US 2021/0094859 A1    Apr. 1, 2021

(51) Int. Cl.
| | | |
|---|---|---|
| *C03B 5/235* | (2006.01) | |
| *C03B 5/225* | (2006.01) | |
| *C03B 5/173* | (2006.01) | |
| *C03C 1/00* | (2006.01) | |
| *C03C 1/04* | (2006.01) | |

(52) U.S. Cl.
CPC .............. *C03B 5/225* (2013.01); *C03B 5/173* (2013.01); *C03B 5/2356* (2013.01); *C03C 1/004* (2013.01); *C03C 1/04* (2013.01)

(58) Field of Classification Search
CPC ....... C03B 5/2356; C03B 5/225; C03C 1/004; C03C 1/105
See application file for complete search history.

(56) References Cited

U.S. PATENT DOCUMENTS

| | | |
|---|---|---|
| 2,254,079 A | 8/1941 | McAlpine |
| 2,274,643 A | 3/1942 | Adams |
| 2,330,324 A | 9/1943 | Adams |
| | (Continued) | |

FOREIGN PATENT DOCUMENTS

| | | |
|---|---|---|
| DE | 4428233 | 8/1995 |
| EP | 0480929 B1 | 4/1995 |
| | (Continued) | |

OTHER PUBLICATIONS

Int. Search Report and Written Opinion, Int. Serial No. PCT/US2020/053195, Int. Filing Date: Sep. 29, 2020, Applicant Owens-Brockway Glass Container Inc., dated Nov. 24, 2020.

*Primary Examiner* — Cynthia Szewczyk

(57) ABSTRACT

In a process for manufacturing glass, a mixture of solid glass-forming materials may be melted by application of heat from one or more submerged combustion burners to produce a volume of unrefined molten glass comprising, by volume, 20% to 40% gas bubbles. A refining agent may be introduced into the unrefined molten glass to promote gas bubble removal from the molten glass. The unrefined molten glass including the refining agent may be heated at a temperature in the range of 1200° C. to 1500° C. to produce a volume of refined molten glass. The refined molten glass may comprise, by volume, fewer gas bubbles than the unrefined molten glass. A colorant material may be introduced into the refined molten glass to produce a volume of molten glass having a final desired color.

23 Claims, 2 Drawing Sheets

(56) References Cited

U.S. PATENT DOCUMENTS

| | | | |
|---|---|---|---|
| 2,331,052 A | 10/1943 | Shadduck | |
| 2,387,222 A | 10/1945 | Wright | |
| 3,057,175 A | 10/1962 | Rough et al. | |
| 3,224,857 A | 12/1965 | Allman et al. | |
| 3,260,587 A | 7/1966 | Dolf et al. | |
| 3,343,935 A | 9/1967 | Keefer et al. | |
| 3,350,185 A | 10/1967 | Rough | |
| 3,486,874 A | 12/1969 | Rough | |
| 3,582,307 A | 6/1971 | Mulfinger et al. | |
| 3,589,885 A | 6/1971 | Monks | |
| 3,606,825 A | 9/1971 | Johnson | |
| 3,642,651 A | 2/1972 | Marboe et al. | |
| 3,926,607 A | 12/1975 | Pellett | |
| 4,313,747 A | 2/1982 | Barton et al. | |
| 4,339,254 A | 7/1982 | Gridley | |
| 4,559,072 A | 12/1985 | Harcuba | |
| 4,632,687 A | 12/1986 | Kunkle et al. | |
| 4,634,461 A * | 1/1987 | Demarest, Jr. | C03B 5/235 65/27 |
| 5,006,142 A | 4/1991 | Weidner et al. | |
| 5,006,144 A | 4/1991 | Knavish | |
| 5,588,978 A * | 12/1996 | Argent | C03B 7/06 65/29.1 |
| 5,665,137 A | 9/1997 | Huang | |
| 5,922,097 A | 7/1999 | Kobayashi et al. | |
| 6,207,284 B1 | 3/2001 | Varanasi et al. | |
| 6,318,126 B1 | 11/2001 | Takei et al. | |
| 6,460,376 B1 | 10/2002 | Jeanvoine et al. | |
| 6,470,710 B1 | 10/2002 | Takei et al. | |
| 6,871,514 B2 | 3/2005 | Muschik et al. | |
| 6,938,441 B1 * | 9/2005 | Hajek | C03C 1/00 65/33.2 |
| 7,562,538 B2 | 7/2009 | Landa et al. | |
| 9,096,452 B2 | 8/2015 | Charbonneau et al. | |
| 2002/0162358 A1 | 11/2002 | Jeavoine et al. | |
| 2006/0105899 A1 | 5/2006 | Jacques et al. | |
| 2013/0072371 A1 | 3/2013 | Jansen et al. | |
| 2013/0239618 A1 * | 9/2013 | Ishikawa | C03B 7/06 65/66 |
| 2014/0090421 A1 * | 4/2014 | Shock | C03B 5/2356 65/134.4 |
| 2014/0090424 A1 | 4/2014 | Charbonneau et al. | |
| 2014/0144185 A1 * | 5/2014 | Shock | C03B 5/225 65/134.9 |
| 2015/0251941 A1 | 9/2015 | Clark | |

FOREIGN PATENT DOCUMENTS

| | | |
|---|---|---|
| GB | 2424644 | 10/2006 |
| JP | 49122516 | 11/1974 |
| JP | 54083012 | 7/1979 |
| WO | WO13/154499 | 10/2013 |

* cited by examiner

GLASS MANUFACTURING PROCESS

The present disclosure is directed to a process for manufacturing glass, and, more specifically, for removing gas bubbles from molten glass.

BACKGROUND

Silica-based glass, such as soda-lime-silica glass, is prevalent in the manufacture of glass containers and other articles. Molten glass used to make such articles is conventionally prepared by melting a mixture of solid glass-forming materials known as a glass batch in a melting tank of a continuous tank glass melting furnace to produce a volume of molten glass known as a glass melt. Additional glass-forming materials are continuously charged into the melting tank, deposited on top of the glass melt already in the furnace, and gradually melted into the melt by the continuous application of heat. Heat may be supplied to the furnace, for example, from one or more combustion burners positioned above and/or below a free surface of the glass melt. Burners positioned above the surface of the glass melt are commonly referred to as overhead burners. Overhead burners generate a flame between the glass melt and a crown of the melting tank, and heat is transferred to the glass-forming materials and the glass melt by radiation from the flame and the crown. Burners positioned below the surface of the glass melt are commonly referred to as submerged combustion burners. A mixture of fuel and an oxidant is fired into the glass melt by the submerged burners, and heat is directly transferred to the glass melt by the products of combustion.

Gas bubbles may be generated within the molten glass during the melting process from various sources. For example, significant quantities of carbon dioxide ($CO_2$) gas are typically generated during the manufacture of soda-lime-silica glass from the thermal decomposition of sodium carbonate ($Na_2CO_3$), calcium carbonate ($CaCO_3$), and other carbonate-based raw materials in the glass batch. In addition, when submerged combustion burners are used to heat the molten glass, gaseous combustion products, including $CO_2$ and moisture ($H_2O$) are released directly into the molten glass and often occupy upwards of 60 vol. % of the resulting molten glass. After the glass-forming materials have been melted and homogenized, the molten glass is thermally conditioned by being cooled down to a suitable temperature for forming. Gas bubbles remaining in the molten glass during the thermal conditioning stage of the process may become trapped in the glass and in the glass articles formed therefrom. However, the presence of gas bubbles within the formed glass articles may be undesirable for certain applications. As a result, various techniques have been proposed and employed to help eliminate gas bubbles from the molten glass upstream of the glass forming operations.

The process of removing gas bubbles from molten glass is known as fining and refining, and is conventionally accomplished by heating the molten glass to a temperature (e.g., 1500-1600° C.) that reduces or maintains the viscosity of the molten glass, and then holding the molten glass at such temperature for a sufficient amount of time for the gas bubbles to rise to a free surface of the molten glass and escape. Chemical compounds known as refining agents are oftentimes added to the glass batch to aid in the refining process. Refining agents function by releasing additional gases into the molten glass when the molten glass is heated to a temperature at or above a predetermined refining-onset temperature. Gas bubbles and dissolved gases in the molten glass diffuse into the new gas bubbles generated by the refining agents, which increases the size of the gas bubbles in the molten glass. As the gas bubbles increase in size so does the buoyancy of the gas bubbles, which increases the rate at which the gas bubbles rise to the surface of the molten glass and are released.

Some examples of refining agents include sodium sulfate ($Na_2SO_4$), sodium chloride (NaCl), arsenic oxide ($As_2O_x$), and antimony oxide ($Sb_2O_x$). When sodium sulfate is used as a refining agent, much of the sulfate decomposes at temperatures between 1300-1550° C. ($SO_4^{2-} \rightarrow SO_2 + \frac{1}{2}O_2 + O^{2-}$), thereby releasing sulfur dioxide ($SO_2$) and oxygen ($O_2$) into the molten glass. Sodium chloride is volatile at temperatures above about 1400° C., and, when the molten glass is heated above this temperature, will release sodium chloride gas into the molten glass. Arsenic (As) and antimony (Sb) are polyvalent ions and can be present in the molten glass in multiple oxidation states depending on the oxidation-reduction (redox) potential of the molten glass (redox ratio=wt % FeO to wt % total iron (as $Fe_2O_3$)), which is a function of the temperature and oxygen partial pressure of the molten glass. For example, when arsenic oxide is used as a refining agent, arsenic pentoxide ($As_2O_5$) and arsenic trioxide ($As_2O_3$) exist in equilibrium with each other in the molten glass ($As_2O_5 \rightleftarrows As_2O_3 + O_2$). When the molten glass is heated at temperatures of 1200° C. and above, the formation of $As_2O_3$ is favored, and oxygen ($O_2$) is released into the molten glass. Thereafter, when the glass is cooled down to a suitable temperature for forming, remaining oxygen bubbles in the molten glass may be reabsorbed back into the glass by reaction with $As_2O_3$ to form $As_2O_5$.

It has been discovered that the use of submerged combustion burners during the glass batch melting stage may undermine the intended purpose of including refining agents in the glass batch. In particular, the use of submerged combustion burners during the melting stage may impair or destroy the ability of the refining agents initially present in the glass batch to assist in refining of the molten glass in the subsequent refining stage. Without intending to be bound by theory, it is believed that the use of submerged combustion burners during the melting stage may destroy the functionality of the refining agents in the glass batch, for example, by stripping the refining agents from the remaining materials in the glass batch and exhausting the refining agents from the melting stage along with the combustion by-products, and/or by triggering thermal decomposition of the refining agents during the melting stage, instead of during the subsequent refining stage. If the refining agents included in the glass batch are evaporated or destroyed during the melting stage, they will not be available to assist in the removal of gas bubbles from the molten glass during the refining stage.

Changes in the redox potential of a glass melt, for example, resulting from the addition of oxidizing and/or reducing agents, may alter the color of the resulting glass. This is because a change in the redox potential of the glass melt may shift the equilibrium of the polyvalent coloring ions in the glass. For example, iron oxide present in the +3 oxidation state imparts a light yellow color to soda-lime glass, while iron oxide present in the +2 oxidation stage imparts a blue color to soda-lime glass. In addition, in a highly reduced soda-lime glass melt, iron may couple with sulfur to produce iron sulfide to produce an amber colored glass.

BRIEF SUMMARY OF THE DISCLOSURE

A general object of the present disclosure, in accordance with one aspect of the disclosure, is to provide a glass manufacturing process in which a glass batch is melted in a first stage via submerged combustion to produce a volume of unrefined molten glass, and then a refining agent is introduced into the unrefined molten glass in a second stage downstream of the first stage. Introducing the refining agent into the unrefined molten glass after completion of the submerged combustion stage ensures that the refining agent is present in the molten glass and available to help release gas bubbles from the molten glass in the subsequent refining stage. The refining agent may assist in refining the molten glass, for example, by increasing the number and/or size of gas bubbles in the molten glass, which may in turn increase the rate at which the gas bubbles rise to the surface of the molten glass and are released. Increasing the number of gas bubbles within the molten glass may promote gas bubble ascension by inducing bubble coalescence and thereby increasing the buoyancy and rate at which the gas bubbles rise to the surface of the molten glass and are released. The refining agent may be formulated to react with one or more gaseous constituents existing in the unrefined molten glass after the submerged combustion stage (e.g., $CO_2$ and/or $H_2O$) to help release such constituents therefrom. In one form, the refining agent may be a reducing agent and its introduction into the molten glass may alter the color of the molten glass. In such case, after the refining stage is complete, a colorant material may be applied to the refined molten glass to counteract the color change or to adjust the color of the molten glass to a final desired color.

The present disclosure embodies a number of aspects that can be implemented separately from or in combination with each other.

A process for manufacturing glass, in accordance with one aspect of the disclosure, includes providing a glass batch comprising a mixture of solid glass-forming materials, melting the glass batch in a melting chamber to produce a volume of unrefined molten glass, directing the unrefined molten glass from the melting chamber into a downstream treatment chamber including a refining section, introducing a refining agent into the unrefined molten glass to promote gas bubble removal from the molten glass, and heating the unrefined molten glass including the refining agent in the refining section of the treatment chamber at a temperature in the range of 1200° C. to 1500° C. to produce a volume of refined molten glass. The unrefined molten glass may comprise, by volume, 20% to 60% gas bubbles and the refined molten glass may comprise, by volume, fewer gas bubbles than the unrefined molten glass. In one form, the treatment chamber may include a color control section downstream of the refining section, and a colorant material may be introduced into the refined molten glass in the color control section of the treatment chamber to produce a volume of molten glass having a final desired color. Glass articles may be formed from the molten glass.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1:
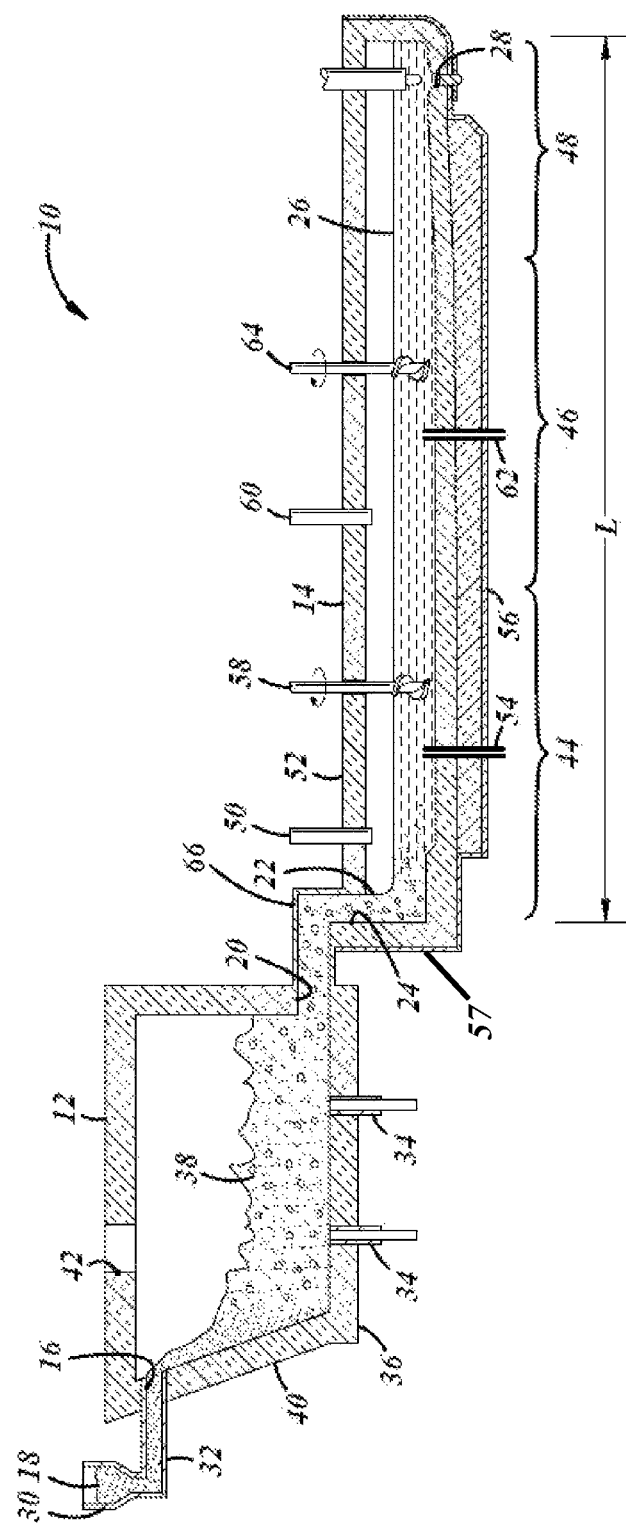
FIG. 1 is a side sectional view of an apparatus for use in carrying out the disclosed glass manufacturing process, in accordance with an illustrative embodiment of the disclosure.

A multistage process for manufacturing glass includes a glass batch preparation stage, a melting stage, a refining stage, an optional color control stage, and a forming stage.

A glass batch comprising a mixture of solid glass-forming materials is provided in the glass batch preparation stage that is formulated to produce a silica-based glass having a desired glass composition. For example, the glass batch may be formulated to produce a soda-lime-silica glass composition including, by weight, 60-75% $SiO_2$, 7-15% $Na_2O$, and 6-12% CaO. The glass batch optionally may include one or more colorant materials. Some examples of colorant materials include polyvalent metal oxides, for example, iron oxide, which may exist in the $Fe^{2+}$ and $Fe^{3+}$ oxidation states. If colorant materials are present in the glass batch, the colorant materials may comprise less than 1.0 wt. % of the glass batch.

The glass batch may be free of chemical refining agents. For example, the glass batch may contain less than 0.1 wt. % or, more preferably, less than 0.01 wt. % of the following refining agents: sulfates such as sodium sulfate ($Na_2SO_4$), carbon (C), arsenic (As), antimony (Sb), and/or metal halide salts (e.g., sodium chloride (NaCl)).

In the melting stage, the solid glass-forming materials are charged into one end of a continuously operated melting chamber and melted by application of heat from one or more submerged combustion burners to produce a volume of unrefined molten glass. The one or more submerged combustion burners may be located in a floor or sidewall of the melting chamber. The glass-forming materials may be heated in the melting chamber via the one or more submerged combustion burners at a temperature in the range of 1200° C. to 1500° C. to produce the volume of unrefined molten glass. In some embodiments, additional heat may be supplied to the solid glass-forming materials in the melting chamber by one or more other energy sources. For example, additional heat may be supplied to the solid glass-forming materials in the melting chamber by one or more overhead burners or submerged electrodes.

After completion of the melting stage, the molten glass is unrefined, meaning that it contains an undesirable amount of gas bubbles, which need to be removed. For example, molten glass produced in the melting chamber by application of heat from the one or more submerged combustion burners may contain between 20 vol. % and 60 vol. % gas bubbles. In one form, the molten glass produced in the melting chamber by application of heat from the one or more submerged combustion burners may contain about 25 vol. % to about 40 vol. % gas bubbles. On the other hand, molten glass produced by application of heat from one or more overhead burners or submerged electrodes—without the use of submerged combustion burners—may contain significantly fewer bubbles on a volume percent basis. For instance, glass produced in a conventional furnace using overhead burners and/or submerged electrodes to supply heat typically contains between 5 vol. % and 10 vol. % of gas bubbles.

Thereafter, the unrefined molten glass is directed to one or more treatment chambers wherein a refining agent is introduced into the unrefined molten glass to help refine the molten glass by promoting the release of gas bubbles therefrom. The refining agent may be introduced into the molten glass in an amount constituting between 0.001 wt. % and 0.1 wt. % of the molten glass and may be introduced into the molten glass in solid, liquid, and/or gaseous form. In one specific example, the refining agent may be introduced into the molten glass in an amount constituting about 0.05 wt. % of the molten glass. Within the treatment chamber(s), the unrefined molten glass may be heated to a temperature in the range of 1200° C. to 1500° C., or more narrowly in the range of 1220° C. to 1300° C., to assist in fining and refining of the glass.

The refining agent may be formulated to promote gas bubble removal from the molten glass by generating additional gas bubbles in the molten glass. The generated gas bubbles may sweep up smaller existing gas bubbles and/or penetrate or react with existing gas bubbles to increase the size of the existing gas bubbles. Both mechanisms ultimately help increase the rate at which the gas bubbles rise to the surface of the molten glass and escape. The refining agent may comprise an element or compound that, when heated to temperatures in the range of 1200° C. to 1400° C., is formulated to thermally decompose or to react with one or more gaseous constituents in the molten glass (e.g., $CO_2$ and/or $H_2O$) to increase the number and/or size of gas bubbles in the molten glass.

The refining agent may comprise one or more elements or compounds (e.g., oxides, nitrides, and/or carbides) of aluminum (Al), silicon (Si), zinc (Zn), copper (Cu), tin (Sn), gallium (Ga), beryllium (Be), boron (B), calcium (Ca), chromium (Cr), germanium (Ge), indium (In), iron (Fe), lithium (Li), magnesium (Mg), mercury (Hg), niobium (Nb), silver (Ag), sodium (Na), strontium (Sr), tantalum (Ta), titanium (Ti), tungsten (W), uranium (U), vanadium (V), yttrium (Y), zirconium (Zr), hafnium (Hf), molybdenum (Mo), phosphorus (P), sulfur (S), carbon (C), and/or hydrogen (H). Some specific examples of refining agents include silicon nitride ($Si_3N_4$), silicon carbide (SiC), aluminum gallium nitride (AlGaN), aluminum nitride (AlN), aluminum oxynitride (AlON), beryllium nitride ($Be_3N_2$), beta carbon nitride ($\beta$-$C_3N_4$), boron nitride (BN), calcium nitride ($Ca_3N_2$), chromium nitride (CrN), disulfur dinitride ($S_2N_2$), gallium nitride (GaN), germanium nitride ($Ge_3N_4$), graphitic carbon nitride (g-$C_3N_4$), indium gallium aluminum nitride (InGaAlN), indium gallium nitride (InGaN), indium nitride (InN), iron nitride (e.g., FeN, $Fe_2N$, $Fe_3N_2$, $Fe_4N$, $Fe_7N_3$, $Fe_8N$, and/or $Fe_{16}N_2$), lithium nitride ($Li_3N$), magnesium nitride ($Mg_3N_2$), mercury nitride ($Hg_3N_2$), niobium nitride (NbN), phosphoryl nitride (OPN), silicon aluminum oxynitride (SiAlON), silicon oxynitride (e.g., $Si_2N_2O$), silver nitride ($Ag_3N$), sodium nitride ($Na_3N$), strontium nitride ($Sr_3N_2$), tantalum nitride (TaN), tetrasulfur tetranitride ($S_4N_4$), titanium aluminium nitride (TiAlN), titanium nitride (TiN), triphosphorus pentanitride ($P_3N_5$), tungsten nitride (e.g., ($W_2N$, WN, and/or $WN_2$)), uranium nitride (e.g., UN, $UN_2$, and/or $U_2N_3$), vanadium nitride (e.g., VN and/or $V_2N$), yttrium nitride (YN), zinc nitride ($Zn_3N_2$), zirconium nitride (ZrN), titanium carbide (TiC), zirconium carbide (ZrC), hafnium carbide (HfC), vanadium carbide (VC), niobium carbide (NbC), tantalum carbide (e.g., TaC), chromium carbide (e.g., $Cr_3C_2$, $Cr_7C_3$, and/or $Cr_{23}C_6$), molybdenum carbide ($Mo_2C$), tungsten carbide (WC), brass (which may include a combination of Cu and Zn), and bronze (which may include a combination of Cu and Sn). In one form, the refining agent may comprise a combination of at least one nitride and at least one carbide. In one specific example, the refining agent may comprise silicon nitride and silicon carbide.

Without intending to be bound by theory, it is believed that introducing a refining agent, for example, of elemental aluminum in powder form into the unrefined molten glass may react with $H_2O$ vapor and $CO_2$—both of which are prevalent in the unrefined molten glass—as shown in chemical reactions (1) and (2) below:

$$2Al + 3H_2O_{(V)} \rightarrow Al_2O_3 + 3H_2 \qquad (1)$$

$$4Al + 3CO_2 \rightarrow 2Al_2O_3 + 3C \qquad (2)$$

As can be seen, aluminum reacts with $H_2O$ vapor to produce $Al_2O_3$ and $H_2$ (reaction 1), and reacts with $CO_2$ to produce and $Al_2O_3$ and carbon (reaction 2). These reactions promote bubble removal from the glass because $H_2$ diffuses more easily through and out of the molten glass than $H_2O$ vapor, and the carbon can be absorbed into the glass matrix, form secondary products such as SiC, or be slowly oxidized into CO. The reactions of aluminum with $H_2O$ vapor and $CO_2$ within the unrefined molten glass also produce $Al_2O_3$. This in-situ synthesis of $Al_2O_3$ may allow for the composition of the glass-forming materials to be adjusted to reduce material costs associated with adding $Al_2O_3$ into the composition of the silica-based glass, if desired, which is often the case when producing soda-lime-silica glass.

Without intending to be bound by theory, it is believed that, when the refining agent comprises silicon nitride ($Si_3N_4$) and/or silicon carbide (SiC), the $Si_3N_4$ and/or SiC may react with $CO_2$, $H_2O$, $SiO_2$ and/or $H_2S$ in the molten glass by one or more of the following chemical reactions to generate additional gas bubbles within the molten glass, and thereby aid in refining of the molten glass:

| | | |
|---|---|---|
| $Si_3N_{4(s)} + CO_{2(g)} \rightarrow$ | $SiO_{2(s)} + SiO_{(g)} + N_{2(g)} + CO_{(g)} + SiON_{2(s)}$ | (1) |
| $Si_3N_{4(s)} + H_2O_{(g)} \rightarrow$ | $NH_{3(g)} + H_{2(g)} + N_{2(g)} + SiO_{2(s)}$ | (2) |
| $Si_3N_{4(s)} + SiO_{2(l)} \rightarrow$ | $N_{2(g)} + SiO_{(s)} + SiO_{2(s)} + Si_{(l)}$ | (3) |
| $Si_3N_{4(s)} + H_2S_{(g)} \rightarrow$ | $SiS_{(g)} + H_{2(g)} + N_{2(g)}$ | (4) |
| $SiC_{(s)} + CO_{2(g)} \rightarrow$ | $SiO_{2(s)} + CO_{(g)}$ | (5) |
| $SiC_{(s)} + H_2O_{(g)} \rightarrow$ | $CH_{4(g)} + SiO_{2(s)}$ | (6) |

In embodiments where the refining agent is in solid form, the refining agent may be in the form of a powder having a mean particle diameter in the range of 0.1 micrometers to 1000 micrometers. In one specific example, the refining agent may be in the form of a powder having a mean particle diameter in the range of 5 micrometers to 750 micrometers. The powder particles may be of different sizes and/or of different shapes (e.g., irregular or spherical). In some embodiments, the solid refining agent may be combined with one or more other solid materials, which may be formulated to help incorporate the refining agent into the molten glass. For example, in one form, the solid refining agent may be mixed with solid particles of a silica-based glass or recycled glass, i.e., cullet. In another form, the refining agent may be fused with one or more glass-forming materials, quenched, granulated, and applied to the molten glass in the form of a solid frit.

In embodiments where the refining agent is in the form of a liquid, the refining agent may comprise a molten metal or metal compound (e.g., molten aluminum) or a liquid organic compound. In embodiments where the refining agent is in the form of a gas, the gaseous refining agent may comprise carbon monoxide (CO), hydrogen gas ($H_2$), or a mixture of hydrogen ($H_2$) and nitrogen ($N_2$) gas (i.e., forming gas).

In embodiments where the refining agent is combined with one or more other materials and introduced into the unrefined molten glass as a composite material, the refining agent may comprise, by weight, between 1% and 30% of the composite material.

After completion of the refining stage, the refined molten glass comprises, by volume, fewer gas bubbles than the unrefined molten glass. The unrefined molten glass may contain between 0 and 0.1 vol. %, and more typically between 0 and 0.05 vol. %, of gas bubbles.

In some embodiments, introducing the refining agent into the molten glass may alter the redox potential of the molten glass and thus its color. More specifically, the evolution and liberation of oxygen and/or oxygen-containing compounds from the molten glass may shift the equilibrium of the polyvalent metal ion colorant materials, which may change the optical properties of the molten glass. For example, if the molten glass contains iron oxide as a colorant material, ferric oxide ($Fe_2O_3$) will be present in the molten glass in equilibrium with ferrous oxide (FeO), with the total amount of iron oxide and the ratio of FeO to $Fe_2O_3$ in the molten glass having a direct impact on the color of the glass. This is because $Fe_2O_3$ imparts a light yellow color to glass, while FeO imparts a relatively intense blue color to glass. When a refining agent such as carbon is introduced into the molten glass, the carbon atoms will chemically react with dissolved oxygen in the molten glass (e.g., with $Fe_2O_3$ by reducing the $Fe_2O_3$ to FeO) to produce carbon monoxide (CO) and/or carbon dioxide ($CO_2$) gas ($C + \frac{1}{2} O_2 \rightleftarrows CO$; $CO + \frac{1}{2} O_2 \rightarrow CO_2$), thereby reducing the amount of dissolved oxygen (and thus the amount of $Fe_2O_3$) in the molten glass. If significant amounts of $Fe_2O_3$ are reduced to FeO, the color of the molten glass may shift from generally colorless to light blue/green.

In embodiments where it is desirable to reverse or compensate for the color change imparted to the molten glass by addition of the refining agent, a colorant material may be added to the molten glass after the refining stage is complete to counteract the color change and/or to adjust the color of the molten glass to a final desired color. In some embodiments, the colorant material may be an oxidizing agent and may comprise at least one of sodium sulfate ($Na_2SO_4$), cerium oxide ($Ce_xO_y$), arsenic oxide ($As_2O_x$), and/or antimony oxide ($Sb_2O_x$). In such case, the colorant material may be introduced into the molten glass in an amount sufficient to return at least some of the polyvalent metal ions in the molten glass to a previous and/or desired oxidation state. For example, the colorant material may be added in an amount sufficient to oxidize at least some of the FeO to $Fe_2O_3$ and to return the molten glass to a generally colorless state. Another example of a suitable oxidizing agent for introducing into the refined molten glass during the color control stage may comprise oxygen ($O_2$) gas.

In other embodiments, the colorant material added to the molten glass in the color control stage of the process may be in the form of an elemental metal or a metal compound that is itself formulated to produce a desired color in soda-lime glass, and not simply to change the oxidation state of another element or compound already present in the molten glass. Examples of suitable metal oxides that may be used as colorant materials in accordance with one or more embodiments of the present disclosure include, for example, iron oxides (e.g., FeO or $Fe_2O_3$), chromium oxides (e.g., CrO or $Cr_2O_3$), and/or cobalt oxides (e.g., CoO or $Co_2O_3$).

In some embodiments, the colorant material may comprise a combination of an oxidizing agent and a polyvalent metal oxide. For example, the colorant material may be formulated to produce amber colored glass and may comprise an oxidizing agent of sodium sulfate ($Na_2SO_4$) and a polyvalent metal oxide of ferric oxide ($Fe_2O_3$).

Once the refined molten glass has reached a final desired color, the temperature of the molten glass may be brought down to a suitable temperature for glass forming operations.

The process for manufacturing glass described above may be used to melt, refine, and homogenize various silica-based glass compositions, including, for example, soda-lime-silica glass. In addition, the disclosed process may be carried out using various glass furnace designs, including, but certainly not limited to, the exemplary designs shown in the drawings and described hereinbelow.

FIG. 1 illustrates an apparatus 10 for continuously melting, fining and refining, and homogenizing a silica-based glass composition in accordance with an exemplary embodiment of the present disclosure. The apparatus 10 includes a melting chamber 12 and a treatment chamber 14. The melting chamber 12 is located at an inlet end of the apparatus 10 and includes an inlet 16 in which solid glass batch materials 18 are received and an outlet 20 from which unrefined molten glass 22 is discharged. The treatment chamber 14 is located downstream of the melting chamber 12 and includes an inlet 24 in fluid communication with the outlet 20 of the melting chamber 12. The unrefined molten glass 22 is received in the treatment chamber 14 via the inlet 24, and refined molten glass 26 is discharged from the treatment chamber 14 via an outlet 28. In the embodiment illustrated in FIG. 1, the refined molten glass 26 exists the apparatus 10 via the outlet 28 in the treatment chamber 14 and may then be directed to one or more glass forming machines (not shown). However, in some embodiments, an additional chamber may be located between the treatment chamber 14 and the one or more forming machines, and this additional chamber may be configured to receive refined molten glass 26 from the treatment chamber 14 via the outlet 28 and to thermally homogenize the refined molten glass prior to delivering the molten glass to the one or more glass forming machines.

In the embodiment illustrated in FIG. 1, the solid glass batch materials 18 are continuously supplied to the inlet 16 of the melting chamber 12 from a hopper 30 via a batch charger 32. The glass batch materials 18 are melted in the melting chamber 12 by application of heat from submerged combustion burners 34 located in a floor 36 of the melting chamber 12 to produce a body of unrefined molten glass 38. However, in other embodiments, the submerged combustion burners 34 may additionally or alternatively be positioned within a sidewall 40 of the melting chamber 12. The submerged combustion burners 34 may be air-fueled or oxygen-fueled burners. Additional heat to melt the glass batch materials 18 may be supplied from one or more energy sources, for example, from one or more submerged electrodes or overhead burners (not shown). An opening 42 may be located in the melting chamber 12 above a free surface of the body of unrefined molten glass 38 from which exhaust gases may be discharged from the melting chamber 12.

After the glass batch materials 18 are initially melted in the melting chamber 12, the body of molten glass 38 will contain an undesirable amount of gas bubbles or gaseous inclusions, and thus will be "unrefined." To remove or at least reduce the amount of gas bubbles or gaseous inclusions therein, a stream of unrefined molten glass 22 is directed away from the melting chamber 12 via the outlet 20 and delivered to the treatment chamber 14 via the inlet 24. The unrefined molten glass 22 may be supplied to the treatment chamber 14 by any suitable means. In the embodiment shown in FIG. 1, the unrefined molten glass 22 is supplied to the treatment chamber 14 via an enclosed passageway 66. A pressure differential may be established across the passageway 66 such that a continuous stream of unrefined molten glass 22 flows from the melting chamber 12, through the passageway 66, and into the treatment chamber 14 without use of a pump or other mechanical device. The pressure differential across the passageway 66 may be established, at least in part, by positioning an inlet of the passageway 66 below the free surface of the body of unrefined molten glass 38 in the melting chamber 12.

The treatment chamber 14 may include a refining section 44 at an inlet end of the treatment chamber 14, an optional color control section 46 downstream of the refining section 44, and a feeder section 48 downstream of the color control section 46 at an outlet end of the treatment chamber 14. The refining section 44 may span between 20% and 50% of a length L of the treatment chamber 14 while the color control section 46 and the feeder section may span between 20% and 50% and between 10% and 30%, respectively, of the length L of the treatment chamber 14.

A refining agent may be introduced into the unrefined molten glass 22 at a location downstream of the outlet 20 of the melting chamber 12 and upstream of the optional color control section 46 and upstream of the feeder section 48. The refining agent may comprise any of the refining agents described above with respect to the present disclosed multistage glass manufacturing process. In some embodiments, the refining agent may be introduced into the unrefined molten glass 22 at a location where the molten glass 22 is turbulent, which may include a location downstream of the outlet 20 of the melting chamber 12 where the unrefined molten glass 22 has irregular flow patterns. In one form, a refining agent may be introduced into the unrefined molten glass 22 as the molten glass 22 flows through the passageway 66. In another form, a refining agent may be introduced into the unrefined molten glass 22 in the refining section 44 of the treatment chamber 14 before the unrefined molten glass 22 settles into a calm flow regime having regular flow patterns. The unrefined molten glass 22 may be turbulent (i.e., experiences irregular flow patterns) within an upstream portion of the refining section 44 that extends no further than 60%, or more narrowly no further than 30% or even no further than 10%, of the length of the refining section 44 of the treatment chamber 14.

As discussed above, the refining agent is formulated to promote gas bubble removal from the unrefined molten glass 22. The refining agent may be in the form of a solid, liquid, and/or gaseous material and may be introduced into the molten glass 22, for example, by being deposited on, injected into, or mixed into the molten glass 22. In one form, the refining agent may be introduced into the molten glass 22 in the passageway 66 or the refining section 44 by being deposited on a free surface of the molten glass 22. For example, the refining agent may be introduced into an interior of the refining section 44 through a conduit 50 extending through a roof 52 of the treatment chamber 14 above a free surface of the molten glass 22. Additionally or alternatively, the refining agent may be introduced into the molten glass 22 in the passageway 66 or the refining section 44 from below a free surface of the molten glass 22. For example, the refining agent may be introduced into the molten glass 22 in the refining section 44 from one or more bubblers 54 extending through a floor 56 or a sidewall 57 of the treatment chamber 14. One or more stirrers 58 may extend into the molten glass 22 in the passageway 66 or the refining section 44 of the treatment chamber 14 to help mix the refining agent into the molten glass 22 and to help increase the rate at which the gas bubbles in the molten glass 22 rise to the free surface of the molten glass 22 and escape.

The treatment chamber 14 may be an enclosed chamber and the environment within the interior of the refining section 44 may be controlled to promote the expeditious removal of gas bubbles from the molten glass 22. More specifically, the temperature, pressure, and/or composition of the environment above the free surface of the molten glass 22 in the interior of the treatment chamber 14 may be controlled. For example, the pressure within the interior of the treatment chamber 14 may be controlled to produce a sub-atmospheric environment therein. The term "sub-atmospheric," as used herein, means an environment having a pressure less than ambient atmospheric pressure, e.g., less than about 760 Torr.

The unrefined molten glass 22 is preferably held within the refining section 44 of the treatment chamber 14 for a sufficient amount of time for the refining agent to chemically react with certain constituents in the molten glass 22 (e.g., polyvalent metal oxides). In addition, the unrefined molten glass 22 is preferably held within the refining section 44 of the treatment chamber 14 for a sufficient amount of time for a significant amount of the gas bubbles in the molten glass 22 to be physically released from the molten glass 22 or chemically absorbed therein. The residence time, or the time a volume of molten glass remains within the treatment chamber 14, may be controlled by controlling the rate at which the unrefined molten glass 22 enters the treatment chamber 14 and the rate at which the refined molten glass 26 exits the treatment chamber 14.

After the quantity of gas bubbles in the molten glass 22 has been reduced to a suitable level for glass forming operations, the molten glass is "refined." However, in some embodiments, the color of the molten glass 26 exiting the refining section 44 of the treatment chamber 14 may be undesirable. Therefore, upon entering the color control section 46 of the treatment chamber 14, a colorant material may be applied to the refined molten glass 26. The colorant material may be a solid or liquid material and may be introduced into the molten glass 26 in the color control section 46 by being deposited on a free surface of the molten glass 26. For example, the colorant material may be introduced into an interior of the color control section 46 through another conduit 60 extending through the roof 52 of the treatment chamber 14 above a free surface of the molten glass 26. Additionally or alternatively, the colorant material may be a gaseous material and may be introduced into the molten glass 26 in the color control section 46 from below a free surface of the molten glass 26. For example, the colorant material may be introduced into the molten glass 26 in the color control section 46 from one or more bubblers 62 extending through the floor 56 of the treatment chamber 14. One or more stirrers 64 may extend into the molten glass 26 in the color control section 46 of the treatment chamber 14 to help mix the colorant material into the molten glass 26. The colorant material may be introduced into the refined molten glass 26 in an amount ranging from, by weight, 0.5% and 3% of the refined molten glass 26.

The refined and color controlled molten glass 26 exits the color control section 46 and enters the feeder section 48 of the treatment chamber 14. In the feeder section 48, the refined molten glass 26 is thermally conditioned by being cooled down to a suitable temperature for downstream forming operations (e.g., less than about 1200 degrees Celsius for glass container forming operations). Thereafter, the refined molten glass 26 is discharged from the treatment chamber 14 via the outlet 28 of the treatment chamber 14.

Figure 2:
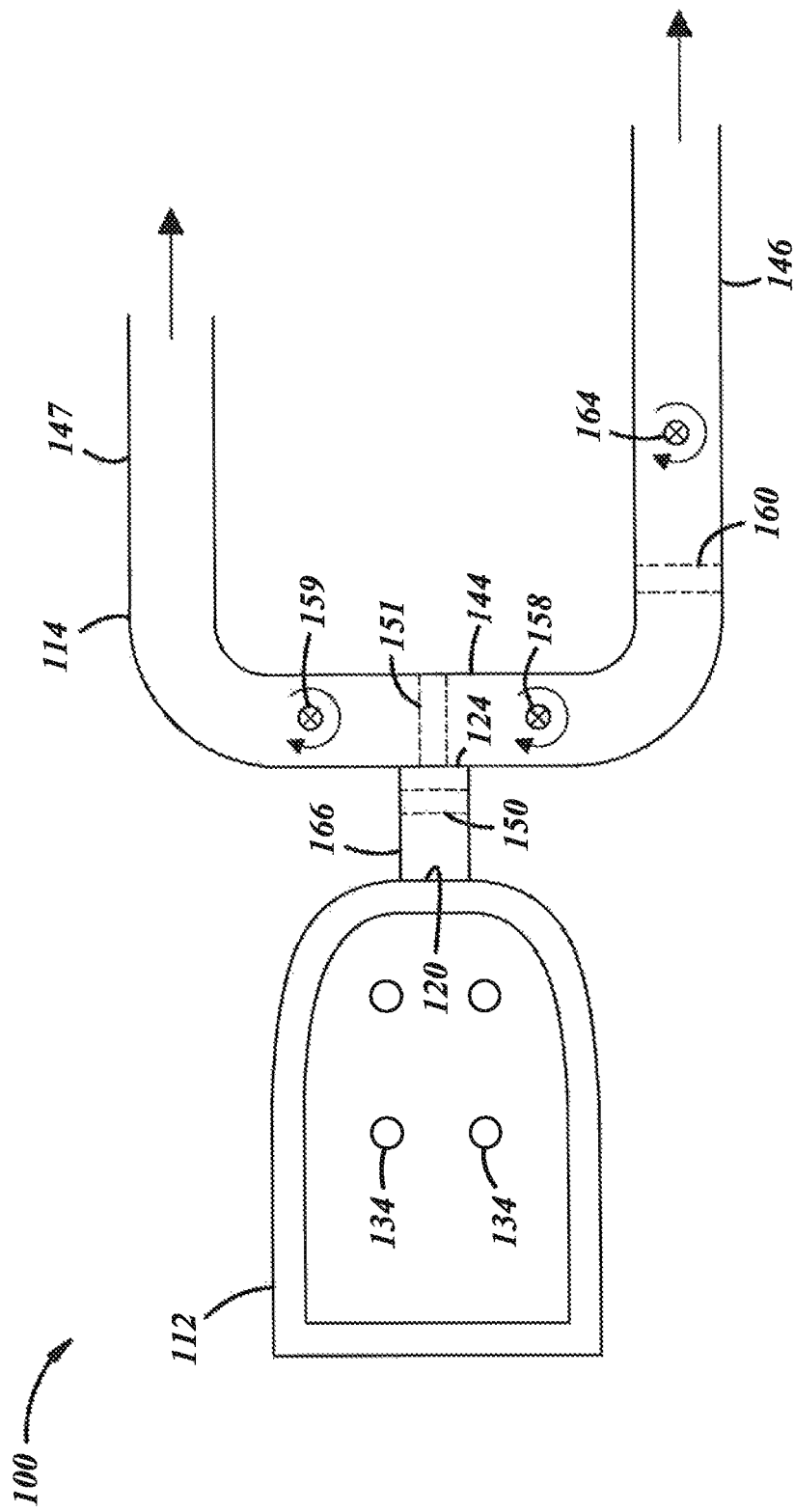
FIG. 2 is a plan view of another apparatus for use in carrying out the disclosed glass manufacturing process, in accordance with another illustrative embodiment of the disclosure.

FIG. 2 illustrates another illustrative embodiment of an apparatus 100 for continuously melting, fining and refining, and homogenizing a silica-based glass composition. The apparatus 100 is similar in many respects to the apparatus 10 of FIG. 1, and like numerals between the two illustrative embodiments generally designate like or corresponding elements. Accordingly, the descriptions of the embodiments illustrated in FIGS. 1 and 2 are incorporated into one another. Common subject matter between the embodiments illustrated in FIGS. 1 and 2 generally may not be repeated here.

The apparatus 100 illustrated in FIG. 2 includes a glass melting chamber 112 and a glass treatment chamber 114 downstream of the melting chamber 112. The melting chamber 112 is located at an upstream end of the apparatus 100. Solid glass batch materials are continuously supplied to the melting chamber 112, and unrefined molten glass is continuously discharged from an outlet 120 of the melting chamber 112. The glass batch materials are melted in the melting chamber 112 by application of heat from submerged combustion burners 134 to produce a body of unrefined molten glass in the melting chamber 112. The treatment chamber 114 is located downstream of the melting chamber 112 and includes an inlet 124 in fluid communication with the outlet 120 of the melting chamber 112. A stream of unrefined molten glass is discharged from the melting chamber 112, directed through a passageway 166, and received in the treatment chamber 114 via the inlet 124.

The treatment chamber 114 includes a distribution section 144 at an inlet end of the chamber 114 and discrete first and second flow channels 146, 147 downstream of the distribution section 144 at an outlet end of the treatment chamber 114. The distribution section 144 receives unrefined molten glass from the melting chamber 112 and splits the stream of unrefined molten glass into two or more discrete streams. In the embodiment illustrated in FIG. 2, the unrefined molten glass is split into two discrete streams that flow in opposite directions relative to each other and in a transverse direction relative to the flow of molten glass through the passageway 166, although this need not be the case.

A refining agent, in the form of a solid, liquid, and/or gaseous material, may be introduced into the unrefined molten glass as the molten glass passes through and/or exits the passageway 166. Additionally or alternatively, a refining agent may be introduced into the unrefined molten glass at an entrance of the distribution section 144. The refining agent may comprise any of the refining agents described above with respect to the presently disclosed multistage glass manufacturing process, and may be introduced into the molten glass, for example, by being deposited on, injected into, or mixed into the molten glass. Some exemplary regions for introducing the refining agent into the unrefined molten glass flowing through the passageway 166 and/or the distribution section 144 are identified by dashed outlines 150, 151 in FIG. 2. Stirrers 158, 159 may extend into each of the discrete streams of unrefined molten glass flowing through the distribution section 144 and into the discrete first and second flow channels 146, 147. The stirrers 158, 159 may help mix the refining agent into the molten glass and also may help increase the rate at which gas bubbles are removed therefrom.

Refined molten glass is discharged from the distribution section 144 and introduced into the first and second flow channels 146, 147. A colorant material may be introduced into the refined molten glass flowing through one or both of the first and second flow channels 146, 147. In the embodiment illustrated in FIG. 2, a colorant material is introduced into the refined molten glass flowing through the first flow channel 146, but not the second flow channel 147. A suitable region for introducing the colorant material into the refined molten glass flowing through the first flow channel 146 is identified by dashed outline 160. A stirrer 164 extends into the molten glass flowing through the first flow channel 146 of the treatment chamber 114 to help mix the colorant material into the molten glass.

Refined and color controlled molten glass is discharged from the first flow channel 146 of the treatment chamber 114 and directed to one or more forming machines. Refined molten glass is discharged from the second flow channel 147 and directed to one or more forming machines. The treatment chamber 114 illustrated in FIG. 2 may allow for the production of one or more different colors of molten glass from the same glass manufacturing apparatus 100.

There thus has been disclosed a process and apparatus for manufacturing glass that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for manufacturing glass comprising:
providing a glass batch comprising a mixture of solid glass-forming materials and being free of chemical refining agents;
melting the glass batch in a melting chamber by application of heat from one or more submerged combustion burners to produce a volume of unrefined molten glass comprising, by volume, 20% to 40% gas bubbles;
directing the unrefined molten glass from the melting chamber into a downstream treatment chamber including a refining section comprising up to the first 50% of a length of the treatment chamber;
introducing a refining agent directly into the unrefined molten glass at a location between outside the melting chamber and an end of the refining section to promote gas bubble removal from the molten glass; and
heating the unrefined molten glass including the refining agent in the refining section of the treatment chamber at a temperature in the range of 1200° C. to 1500° C. to produce a volume of refined molten glass, the refined molten glass comprising, by volume, fewer gas bubbles than the unrefined molten glass.

2. The process set forth in claim 1 wherein the glass batch contains, by weight, less than 0.1% refining agents selected from the group consisting of: sulfur-containing materials, sulfate compounds, arsenic oxides, antimony oxides, cerium oxides, and metal halide salts.

3. The process set forth in claim 1 wherein the refining agent is formulated to promote gas bubble removal from the unrefined molten glass by generating additional gas bubbles in the unrefined molten glass or by increasing the size of gas bubbles existing in the unrefined molten glass.

4. The process set forth in claim 1 wherein the glass batch is melted in the melting chamber at a temperature in the range of 1200° C. to 1500° C.

5. The process set forth in claim 1 wherein the refining agent is introduced by injection directly into the unrefined molten glass in the refining section of the treatment chamber.

6. The process set forth in claim 1 wherein the refining agent is introduced directly into the unrefined molten glass in a passageway located between the melting chamber and the treatment chamber.

7. The process set forth in claim 1 wherein the refining agent is introduced directly into the unrefined molten glass at a turbulent location downstream of the melting chamber within the first 60% of a length of the refining section of the treatment chamber.

8. The process set forth in claim 1 wherein the refining agent is introduced into the unrefined molten glass in an amount constituting, by weight, between 0.001% and 0.1% of the unrefined molten glass.

9. The process set forth in claim 1 wherein the refining agent comprises at least one element selected from the group consisting of: aluminum (Al), silicon (Si), zinc (Zn), copper (Cu), tin (Sn), gallium (Ga), beryllium (Be), boron (B), calcium (Ca), chromium (Cr), germanium (Ge), indium (In), iron (Fe), lithium (Li), magnesium (Mg), mercury (Hg), niobium (Nb), silver (Ag), sodium (Na), strontium (Sr), tantalum (Ta), titanium (Ti), tungsten (W), uranium (U), vanadium (V), yttrium (Y), zirconium (Zr), hafnium (Hf), niobium (Nb), molybdenum (Mo), phosphorus (P), sulfur (S), carbon (C), and/or hydrogen (H).

10. The process set forth in claim 1 wherein the refining agent comprises at least one oxide, nitride, carbide, or oxynitride of silicon (Si), aluminum (Al), gallium (Ga), beryllium (Be), boron (B), calcium (Ca), carbon (C), chromium (Cr), sulfur (S), germanium (Ge), indium (In), iron (Fe), lithium (Li), magnesium (Mg), mercury (Hg), niobium (Nb), phosphorus (P), silver (Ag), sodium (Na), strontium (Sr), tantalum (Ta), titanium (Ti), tungsten (W), uranium (U), vanadium (V), yttrium (Y), zinc (Zn), zirconium (Zr), hafnium (Hf), and molybdenum (Mo).

11. The process set forth in claim 1 wherein the refining agent comprises at least one nitride and at least one carbide.

12. The process set forth in claim 1 wherein the refining agent comprises silicon nitride and silicon carbide.

13. The process set forth in claim 1 wherein the refining agent comprises a solid powder having a mean particle diameter in the range of 0.1 micrometers to 1000 micrometers.

14. The process set forth in claim 1 wherein the solid powder comprises a plurality of particles of different sizes or different shapes.

15. The process set forth in claim 1 wherein the refining agent comprises a molten metal, a molten metal compound, or a liquid organic compound.

16. The process set forth in claim 1 wherein the refining agent comprises a gaseous material selected from the group consisting of carbon monoxide (CO), hydrogen ($H_2$), nitrogen ($N_2$), and combinations thereof.

17. The process set forth in claim 1 including:
forming glass articles from the molten glass.

18. The process set forth in claim 1 wherein the refined molten glass comprises from 0 to 0.1 volume % bubbles.

19. A process for manufacturing glass comprising:
providing a glass batch comprising a mixture of solid glass-forming materials and being free of chemical refining agents;
melting the glass batch in a melting chamber via application of heat from one or more submerged combustion burners to produce a volume of unrefined molten glass comprising, by volume, 20% to 40% gas bubbles;
directing the unrefined molten glass from the melting chamber into a treatment chamber including a refining section and a color control section located downstream of the refining section;
introducing a refining agent directly into the unrefined molten glass at a location between outside of the melting chamber and outside of the color control section to promote gas bubble removal from the unrefined molten glass;
heating the unrefined molten glass including the refining agent in the refining section of the treatment chamber at a temperature in the range of 1200° C. to 1500° C. to produce a volume of refined molten glass, the refined molten glass comprising, by volume, fewer gas bubbles than the unrefined molten glass;
introducing a colorant material into the refined molten glass from the refining section in the color control section of the treatment chamber to produce a volume of refined molten glass having a final desired color; and then
forming glass articles from the refined molten glass.

20. The process set forth in claim 19 wherein the refining agent is a reducing agent.

21. The process set forth in claim 20 wherein the refining agent comprises at least one element or compound selected from the group consisting of aluminum (Al), silicon (Si), zinc (Zn), copper (Cu), tin (Sn), and carbon (C).

22. The process set forth in claim 20 wherein the colorant material is an oxidizing agent, and wherein the colorant material comprises at least one material selected from the group consisting of sulfur-containing materials, sulfate compounds, arsenic oxides, antimony oxides, and cerium oxides.

23. The process set forth in claim 19 wherein the colorant material is introduced into the refined molten glass in an amount constituting, by weight, between 0.5% and 3% of the refined molten glass.

* * * * *